(12) United States Patent
Kim et al.

(10) Patent No.: US 8,771,632 B2
(45) Date of Patent: Jul. 8, 2014

(54) METHODS OF FORMING METAL OXIDE NANOSTRUCTURES, AND NANOSTRUCTURES THEREOF

(75) Inventors: Ho-Cheol Kim, San Jose, CA (US); Robert D. Miller, San Jose, CA (US); Oun Ho Park, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/571,791

(22) Filed: Aug. 10, 2012

(65) Prior Publication Data
US 2012/0308476 A1 Dec. 6, 2012

Related U.S. Application Data

(62) Division of application No. 12/496,784, filed on Jul. 2, 2009.

(51) Int. Cl.
*C01G 23/00* (2006.01)
*B05D 3/06* (2006.01)

(52) U.S. Cl.
USPC .................... 423/608; 427/376.2; 427/553

(58) Field of Classification Search
USPC ........ 427/277, 376.2, 552, 553, 226; 423/608
See application file for complete search history.

(56) References Cited

U.S. PATENT DOCUMENTS

| | | | |
|---|---|---|---|
| 4,485,094 A | 11/1984 | Pebler et al. | |
| 6,589,457 B1 | 7/2003 | Li et al. | |
| 6,849,558 B2 | 2/2005 | Schaper | |
| 7,125,639 B2 | 10/2006 | Schaper | |
| 7,345,002 B2 | 3/2008 | Schaper | |
| 2002/0123009 A1 | 9/2002 | Schaper | |
| 2003/0219992 A1 | 11/2003 | Schaper | |
| 2006/0035164 A1 | 2/2006 | Schaper | |
| 2006/0057766 A1 | 3/2006 | Jia et al. | |

FOREIGN PATENT DOCUMENTS

| | | |
|---|---|---|
| JP | 51148426 A | 12/1976 |
| JP | 2006265352 A | 10/2006 |
| WO | WO2004027460 A2 | 4/2004 |
| WO | WO2004062795 A2 | 7/2004 |

OTHER PUBLICATIONS

Park et al. "High-Aspect—Ratio Cylindrical Nanopore Arrays and Their Use for Templating Titania Nanoposts", Advanced Materials, 20, p. 738-742.*
Goh et al. "Nanostructuring Titania by Embossing with Polymer Molds Made from Anodic Alumina Templates", vol. 5, p. 1545-1549.*
Cesano et al. "Oriented TiO2 Nanostructured Pillar Arrays: Synthesis and Characterization" 2008, Adv. Mater. 20, 3342-3348.*

(Continued)

*Primary Examiner* — Stanley Silverman
*Assistant Examiner* — Syed Iqbal
(74) *Attorney, Agent, or Firm* — Cantor Colburn LLP (57) ABSTRACT

A method of forming a metal oxide nanostructure comprises disposing a chelated oligomeric metal oxide precursor on a solvent-soluble template to form a first structure comprising a deformable chelated oligomeric metal oxide precursor layer; setting the deformable chelated oligomeric metal oxide precursor layer to form a second structure comprising a set metal oxide precursor layer; dissolving the solvent-soluble template with a solvent to form a third structure comprising the set metal oxide precursor layer; and thermally treating the third structure to form the metal oxide nanostructure.

2 Claims, 7 Drawing Sheets

(56) References Cited

OTHER PUBLICATIONS

Goh et al., "Nanostructuring Titania by Embossing with Polymer Molds Made from Anodic Alumina Templates," Nano Lett. 5 1545 (2005).

Hampton et al., The Patterning of Sub-500 nm Inorganic Oxide Structures, Adv. Mater. 20, 2667 (2008).

Noma et al., "Preparation of New Photosensitive ZrO2 Gel Films Using Hydroxyl-Substituted Aromatic Ketones as Chemical Modification Reagents and their Patterning," J. Sol-Gel Sci. & Technol. 31 (2004) 253.

Park et al. "High-Aspect-Ratio Cyl.indrical Nanopore Arrays and Their Use for Templating Titania Nanoposts", Advanced Materials. 20, p. 738-742 (2008).

Passinger et al., "Direct 3D Patterning of TiO2 Using Femtosecond Laser Pulses," Adv. Mater. 19, 1218 (2007).

Saifullah et al., "Sub-10 nm Electron Beam Nanolithography Using Spin-Coatable TiO2 Resists," Nano Lett. 3, 1587 (2003).

Schaper, "Patterned Transfer of Metallic Thin Film Nanostructures by Water-Soluble Polymer Templates," Nano Lett. 3, 1305 (2003).

Schaper, "Planarizing Surface Topography by Polymer Adhesion to Water-Soluble Templates with Replicated Null Pattern," Langmuir 20, 227 (2004).

Shimnou et al. "Fine Patterning of ZrO2 Thin Films by the Photolysis of Chemically Modified Gel Films," Jpn. J. Appl. Phys. 33, 1181 (1994).

Toghe et al., "Effects of UV-Irradiation on the Formation of Oxide Thin Films from Chemically Modified Metal-Alkoxides," J. Sol-Gel. Sci & Technol. 2, 581 (1994).

Tohge et al., "Photosensitive Gel Films Prepared by the Chemical Modification and their Application to Surface-Relief Gratings," Thin Solid Films 351, 85 (1999).

Wang et al., "Patterning of Polymeric/Inorganic Nanocomposite and Nanoparticle Layers," Chem. Mater. 14, 4812 (2002).

Yang et al., "Heirarchically Ordered Oxides," Science 282, 2244 (1998).

* cited by examiner

TiO2 Grids

METHODS OF FORMING METAL OXIDE NANOSTRUCTURES, AND NANOSTRUCTURES THEREOF

CROSS REFERENCE TO RELATED APPLICATIONS

This application is a divisional application of and claims priority to U.S. application Ser. No. 12/496,784, filed on Jul. 2, 2009, incorporated herein by reference in its entirety.

BACKGROUND

The present disclosure is generally related to methods of forming metal oxide nanostructures and nanostructures thereof, in particular, titania nanostructures.

Titania is a well-know material with a broad range of applications including photonic crystals, photocatalysts, and photovoltaic cells. While several methods are known for nanostructuring titania, including thermal imprinting, many challenges remain mainly due to the properties of commonly-used sol-gel type titania precursors. The sol-gel type titania precursors are formed at low pH (approximately 1), are generally highly reactive and moisture sensitive, and form gels. They are often diluted in organic solvents during the sol-gel reaction to mitigate gelation, which causes large volume shrinkages during the nanostructuring process. Further, they are usually highly viscous and require high pressure for the nanostructuring process. Prior work directed toward thermal imprinting titania nanostructures used sol-gel type precursors [C. Goh, K. M. Coakley, M. D. McGehee, Nano Lett. 5, 1545 (2005), P. Yang, T. Deng, D. Zhao, P. Feng, D. Pine, B. F. Chmelka, G. M. Whitesides, G. D. Stucky, Science, 282, 2244, (1998)] or a mixture of titania colloidal particles and polymers [M. Wang, H.-G. Braun, and E. Meyer, Chem. Mater. 14, 4812 (2002)].

BRIEF SUMMARY

Preferred aspects of the present invention are methods that employ a metal oxide material that has optimal properties for the process, such as low viscosity, controlled reactivity, UV-curability, and structural stability during calcination.

In one aspect, a method of forming a metal oxide nanostructure comprises disposing a chelated oligomeric metal oxide precursor on a solvent-soluble template to form a first structure comprising a deformable chelated oligomeric metal oxide precursor layer; setting the deformable chelated oligomeric metal oxide precursor layer to form a second structure comprising a set metal oxide precursor layer; dissolving the solvent-soluble template with a solvent to form a third structure comprising the set metal oxide precursor layer; and thermally treating the third structure to form the metal oxide nanostructure.

In another aspect, a method of forming a metal oxide nanostructure comprises disposing a chelated oligomeric metal oxide precursor on a solvent-soluble template to form a first structure comprising a chelated oligomeric metal oxide precursor layer having an exposed surface; bonding a substrate to an exposed surface of the chelated oligomeric metal oxide precursor layer to form a second structure comprising a chelated oligomeric metal oxide precursor layer; setting the chelated oligomeric metal oxide precursor layer of the second structure to form a third structure comprising a set metal oxide precursor layer; dissolving the solvent-soluble template with a solvent to form a fourth structure comprising the set metal oxide precursor layer; and thermally treating the fourth structure to form a fifth structure comprising a metal oxide nanostructure bonded to the substrate.

In another aspect, a method of forming a metal oxide nanostructure comprises disposing a chelated oligomeric metal oxide precursor on a substrate to form a first structure comprising a deformable chelated oligomeric metal oxide precursor layer; contacting a solvent-soluble template to the deformable chelated oligomeric metal oxide precursor layer to form a second structure comprising a shaped chelated oligomeric metal oxide precursor layer; setting the shaped chelated oligomeric metal oxide precursor layer of the second structure to form a third structure comprising a set metal oxide precursor layer; dissolving the solvent-soluble template with a solvent to form a fourth structure comprising the set metal oxide precursor layer; and thermally treating the fourth structure to form the metal oxide nanostructure.

Also disclosed are metal oxide nanostructures derived from a chelated oligomeric metal oxide precursor.

DETAILED DESCRIPTION

Disclosed methods of forming metal oxide nanostructures employ non-sol-gel type chelated oligomeric metal oxide precursors. The chelated oligomeric metal oxide precursors can be easily thermally deformable and have high solid content. Further, the solid content can be controlled by the addition of solvent if desired. In particular the chelated oligomeric metal oxide is a titania precursor.

The following Scheme (I) illustrates a non-limiting example of the preparation of a chelated oligomeric metal oxide precursor of general formula (3) used in forming the metal oxide nanostructures. Chelated oligomeric metal oxide precursor (3) is derived from a polymetalate of general formula (1) and a chelating agent of general formula (2). The reaction does not require the presence of water or acid.

Scheme (I)

M in formulas (1) and (3) can be a metal selected from the group consisting of transition metals (Group 3 to Group 12 elements of the periodic table) including lanthanides, zinc, aluminum, gallium, indium, thallium, germanium, tin, lead, antimony, bismuth, and combinations thereof In particular, M may be titanium. Each R in the polymetalate (1) can independently represent a group having 1 to 20 carbons. More specifically, R is an alkyl radical or branched alkyl radical selected from the group consisting of methyl, ethyl, propyl, iso-propyl, n-butyl, iso-butyl, tert-butyl, pentyl, iso-pentyl, hexyl, heptyl, n-octyl, and combinations thereof Subscript x can be an integer equal to the metal valence minus 2. Subscript n is an integer greater than or equal to 2; more specifically, n is an integer from 2 to about 1000. Even more specifically, n is an integer from 2 to about 100; and still more specifically, n is an integer from 2 to about 10. Subscript m is an integer from zero to n−1.

The chelating agent (2) is an enolizable material; for example, beta-diketone, beta-keto acid, beta-keto ester, beta-keto amide, malonic diester, malonic diamide, or combination thereof. R' and R" in formula (2) can independently contain 1 to 20 carbons representing an alkyl radical, branched alkyl radical, aryl radical, or substituted aryl radical. R' and R" can further independently represent an oxygen or nitrogen bearing group having 1 to 20 carbons, including substituted and unsubstituted members of the group consisting of alkoxy groups, aryloxy groups, primary alkylamino groups, secondary alkylamino groups, and tertiary alkylamino groups wherein the oxygen or nitrogen is bound to one or more of the carbonyl groups of formula (2). Exemplary chelating agents include 1-phenyl-1,3-butanedione, 2,4-pentanedione (acetylacetone), 1,1,1-trifluoro-2,4-pentanedione, 2,4-hexanedione, 5,7-nonanedione, benzoylacetone, dibenzoylmethane, 2'-napthaloyl acetone, 9'-anthryloyl methane, diisobutyrylmethane, 2,2-dimethylheptane-3,5-dione; 2,2,6-trimethylheptane-3,5-dione, 2,2,6,6-tetramethyl-3,5-heptanedione, dipivaloylmethane, ethyl acetoacetate, and tetramethylheptanedione. The chelating agent can also be a salen, alpha diketone bis oxime, or 7-hydroxyquinolate. The term "salen" is a contraction used to refer to those ligands typically formed through a salicylic aldehyde derivative with one molecule of a diamine derivative. While salen ligands are formed from ethylenediamine derivatives, propyl and butyl diamines can also be used to give analogous "salpn" and "salbn" derivatives.

The chelating agent is present in an amount of 10 mole percent to 100 mole percent relative to metal ion; more particularly, 50 mole percent to 100 mole percent relative to metal ion; and even more particularly, 75 to 100 mole percent.

In a specific embodiment, represented in Scheme (II), polytitanate of general formula (4) is treated with chelating agent (5) to form oligomeric chelated titanium oxide precursor of general formula (6).

Scheme (II).

R, R', R" and n have the same meaning as defined above for formulas (1) and (2). Subscript m can be an integer from zero to n−1. In a specific embodiment, R is n-butyl and n is an integer from 2 to about 10, m is zero, R' is phenyl, and R" is methyl.

Figure 1:
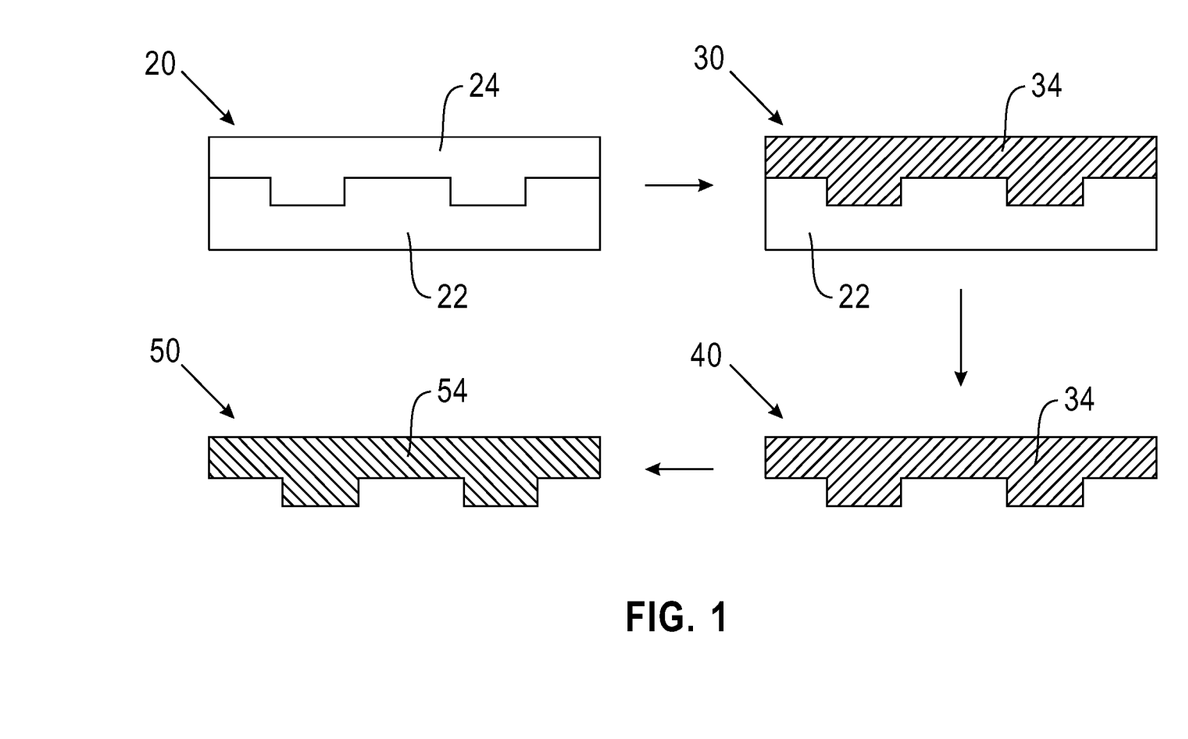
FIG. 1 is a schematic of the typical process flow of forming a metal oxide nanostructure by transfer molding.

FIG. 1 is a schematic of the process flow of forming a metal oxide nanostructure 50 by transfer molding. The transfer molding method comprises disposing the above-described chelated oligomeric metal oxide precursor on a solvent-soluble template 22 to form a first structure 20 comprising a deformable chelated oligomeric metal oxide precursor layer 24 [C. D. Schaper, A. Miahnahri, J. Vac. Sci. Technol. B 22, 3323 (2004), C. D. Schaper, Langmuir 20, 227 (2004), C. D. Schaper, Nano Lett. 3, 1305 (2003)]; setting the deformable chelated oligomeric metal oxide precursor layer 24 of first structure 20 to form a second structure 30 comprising a set metal oxide precursor layer 34; dissolving the solvent-soluble template 22 with a solvent to form a third structure 40 comprising the set metal oxide precursor layer 34; and thermally treating the third structure 40 to form fourth structure 50 comprising metal oxide nanostructure 54.

Disposing the chelated oligomeric metal oxide precursor on a solvent-soluble template 22 can be accomplished by spray coating, dip coating, meniscus coating, spin coating, or ink jet printing a liquid mixture comprising the chelated oligomeric metal oxide precursor in a suitable organic solvent, and removing the solvent. The shape of the template determines the deposition technique and optimal conditions therefor. Each would be readily apparent to the skilled artisan. Exemplary but non-limiting solvents include propylene glycol propyl ether (PGPE), propylene glycol methyl ether, propylene glycol methyl ether acetate, tetrahydrofuran, ethylene glycol dimethyl ether, diglyme, n-butanol, acetone, ethanol, isopropanol, toluene, anisole, chloroform and the like. The solvent can optionally include water. In a specific embodiment, the solvent does not include water.

After the initial deposition of the chelated oligomeric metal oxide precursor, the resulting structure 20 can optionally be treated to obtain a solvent-free or otherwise stable, uniform thin film. In one treatment, structure 20 can be heated to temperatures of from about 50° C. to about 150° C. for from about 1 minute to several hours, more particularly less than one hour. Another optional treatment involves subjecting structure 20 to air flow or vacuum to remove residual solvent. The deformable chelated oligomeric metal oxide precursor layer 24 can have any suitable thickness, typically from about 0.05 micrometers to about 1000 micrometers, more particularly about 1 micrometer to about 100 micrometers.

"Setting" refers to forming a free-standing three-dimensional polymeric network of the metal oxide precursor. For example, the network can have the form of a crosslinked gel. The set metal oxide precursor further comprises a carbon-containing component. Setting can be accomplished by known methods, including UV-irradiation, electron beam irradiation, ionizing radiation, heating, or a combination thereof. In particular, UV-irradiation is employed to set the deformable oligomeric metal oxide precursor layer. The UV-sensitivity of the oligomeric metal oxide precursor can be suitably controlled by the choice and/or amount of chelating agent associated with the metal in the chelated oligomeric metal oxide precursor. Without being bound by theory, setting is attributed to dissociation of the chelating agent from the chelated oligomeric metal-oxide precursor causing the oligomers to crosslink into a three-dimensional polymeric network.

Thermally treating the set metal oxide precursor layer to form the metal oxide nanostructure can be performed at a temperature of about 250° C. to about 950° C. More particularly, the thermal treatment is performed at a temperature of greater than about 400° C., and even more particularly about 450° C. to about 650° C., for a period of time sufficient to convert the set metal oxide precursor to a metal oxide. The thermal treatment can be by calcining. Calcining oxidatively removes the carbon-containing component of the set metal oxide precursor, leaving only the metal oxide nanostructure. The time of thermal treatment can be for a period of about 30 minutes to about 24 hours.

The metal oxide nanostructure has a crystalline structure that can be porous or non-porous. The pores can have a dimension of from 0.005 micrometers to 10 micrometers, more specifically, 0.01 micrometers to 0.1 micrometer.

Figure 2:
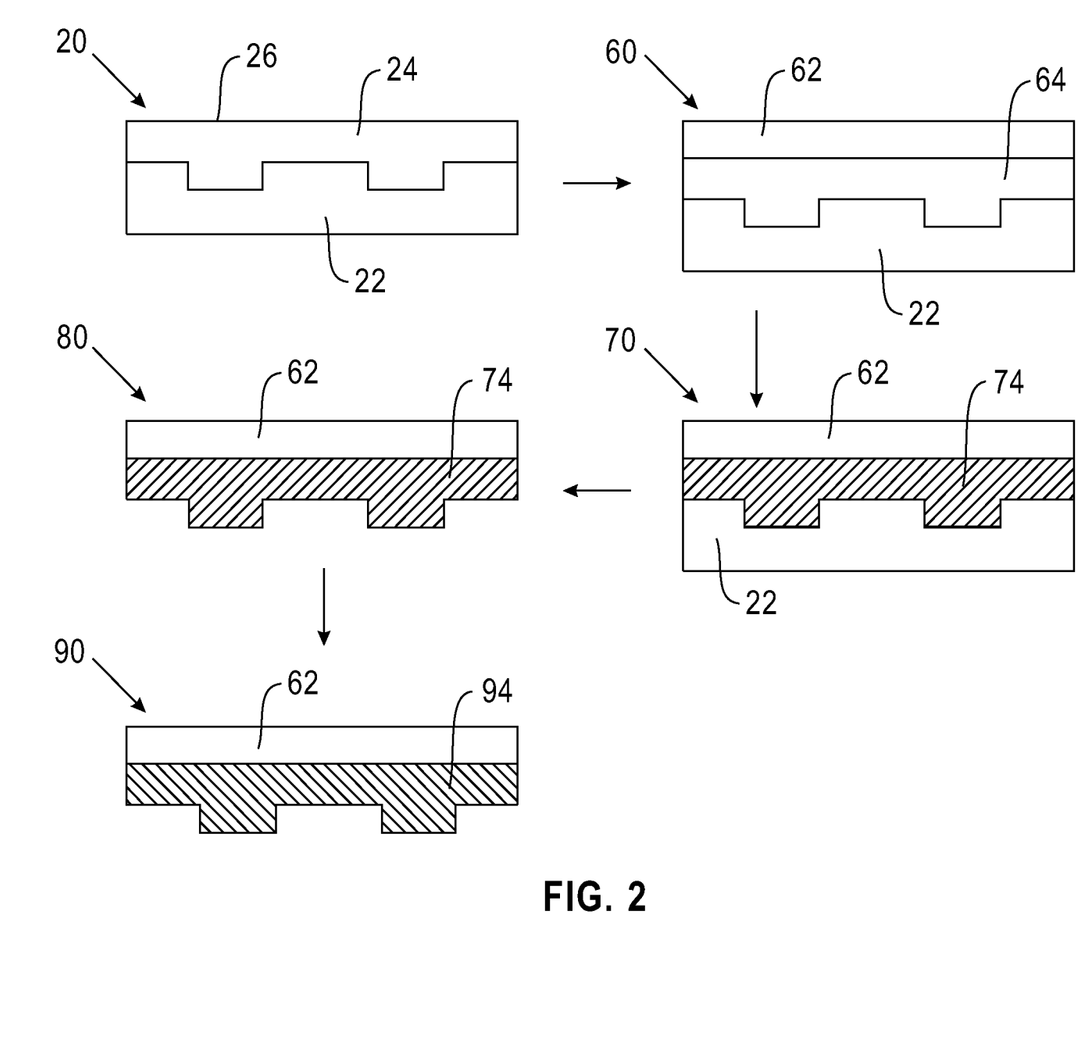
FIG. 2 is a schematic of a transfer molding process to form a metal oxide nanostructure wherein a substrate is laminated to a deformable metal oxide precursor layer prior to setting the metal oxide precursor layer.

In one embodiment the deformable chelated oligomeric metal oxide precursor layer 24 is bonded to a substrate prior to setting, as shown schematically in FIG. 2. This method comprises disposing the above-described chelated oligomeric metal oxide precursor on a solvent-soluble template 22 to form a first structure 20 comprising an chelated oligomeric metal oxide precursor layer 24 having an exposed surface 26; bonding a substrate 62 to the exposed surface 26 of the chelated oligomeric metal oxide precursor layer 24 to form a second structure 60 comprising chelated oligomeric metal oxide precursor layer 64; setting the chelated oligomeric metal oxide precursor layer 64 of second structure 60 to form a third structure 70 comprising a set metal oxide precursor layer 74 bonded to the substrate 62; dissolving the solvent-soluble template 22 with a solvent to form a fourth structure 80 comprising the set metal oxide precursor layer 74 bonded to the substrate 62; and thermally treating the fourth structure 80 to form a fifth structure 90 comprising the metal oxide nanostructure 94 bonded to the substrate 62.

The substrate 62 can comprise a semiconductor material. Exemplary semiconductor materials include but are not limited to: silicon, germanium, silicon-germanium alloy, silicon carbide and silicon-germanium carbide alloy semiconductor materials. In addition, semiconductor materials can also include compound (II-VI and III-V) semiconductor materials of which gallium arsenide, indium arsenide and indium phosphide are non-limiting examples. In particular, the substrate comprises silicon, SiGe, SiC, and Ge. Other substrates include glass or fused silica and conductive substrates comprising a conductive metal or a conductive metal oxide deposited on quartz or glass. Conductive metals include transition metals such as titanium, manganese, iron, nickel, copper, zinc, molybdenum, palladium, silver, platinum, and gold; Group II metals such as magnesium, and Group XIII and XIV metals such as aluminum, gallium, indium, and tin; and combinations of the foregoing metals. Conductive metal oxides include for example oxides of transition metals such as copper, gold, silver, platinum, palladium; oxides of group 13 metals including indium and gallium; oxides of group 14 metals, specifically germanium, tin, and lead; oxides of group 15 elements, specifically arsenic, antimony, and bismuth; and combinations thereof Specific metal oxides include tin oxide ($SnO_2$), fluorinated tin oxide, indium tin oxide (ITO, $InSnO_2$), zinc oxide (ZnO), or combinations thereof deposited on glass or quartz. In particular, the metal oxide is transparent.

Bonding the substrate 62 to the chelated oligomeric metal oxide precursor layer 24 can be effected by lamination techniques that include the application of suitable heat and/or pressure to form second structure 60. Bonding can optionally include an adhesive interfacial surface. The adhesive interfacial surface interposed between the substrate 62 and the oligomeric metal oxide precursor layer 24 can optionally comprise a polymeric or non-polymeric adhesive material. Bonding is generally undertaken using a pressure laminating method. Bonding methods that use adhesive material interposed between the substrate 62 and the chelated oligomeric metal oxide precursor layer 24 can be used as an adjunct or an alternative to a pressure laminating method. The bonding adhesive should be thermally stable to the final processing conditions of the ceramic nanostructure.

The template can be soluble in organic solvent, water, or mixtures thereof No restriction is placed on the template composition, providing the desirable properties of the template are not adversely affected; for example, the solubility of the template after setting the oligomeric metal oxide precursor layer. In particular, the template comprises a water-soluble polymer. The water-soluble polymer can be soluble at acidic pH (0 to less than 7), alkaline pH (7 to 14), or both. Exemplary water-soluble polymers include, for example, poly(vinyl alcohol) resins comprising hydrophilic hydroxyl groups [e.g., poly(vinyl alcohol) (PVA), acetyl-modified poly(vinyl alcohol), cation-modified poly(vinyl alcohol), anion-modified poly(vinyl alcohol), silanol-modified poly(vinyl alcohol), and poly(vinyl acetal)], cellulose resins [e.g., methyl cellulose (MC), ethyl cellulose (EC), hydroxyethyl cellulose (HEC), carboxymethyl cellulose (CMC), hydroxypropyl cellulose (HPC), hydroxyethylmethyl cellulose, and hydroxypropylmethyl cellulose], chitins, chitosans, starches, gelatins, polyethers [e.g., polyethylene oxide (PEO), polypropylene oxide (PPO), polyethylene glycol (PEG), and polyvinyl ether (PVE)], and resins comprising carbamoyl groups [e.g., polyacrylamide (PAA), polyvinylpyrrolidone (PVP), and polyacrylic hydrazide].

In a specific embodiment, the template consists essentially of polyvinyl alcohol (PVA). The poly(vinylalcohol) can have a weight average molecular weight of from about 5,000 to about 100,000, and 80 to 99 percent of the structural subunits are hydrolyzed; that is, the poly(vinylalchohol) is derived from poly(vinyl acetate) by hydrolysis of 80 to 99 percent of the acetate groups.

The template comprises a relief surface for forming a patterned layer of chelated oligomeric metal oxide precursor. The relief surface can have any topographic pattern suitable for the intended use of the metal oxide nanostructure. The relief surface of template 22 in FIGS. 1 and 2 is exemplary and not meant to be limiting.

When desirable, the template can comprise water-insoluble polymers and copolymers for dissolution in an organic solvent; for example, the template can comprise polystyrenes, polyacrylates, polymethacrylates, poly(vinyl esters), poly(vinyl alkylidenes), poly(vinyl chloride), polyesters such as poly(butylene terephthalate) and poly(ethylene terephthalate), and polycarbonates.

The templates can comprise a water-insoluble polymer capable of undergoing chemical deprotection to form water-soluble polymers. In one example, the template composition can comprise an acid-labile, water-insoluble polyacrylate and a photoacid generator. Acid mediated deprotection of polyacrylate ester groups to carboxylic acid groups can be initiated by suitably irradiating the photoacid generator component contained in the template, resulting in the release of acid. Heating the irradiated exposed structure containing the released acid can then induce ester deprotection, forming a water-soluble template. The template can also be soluble in dilute aqueous alkali solutions (e.g., 0.25N sodium hydroxide, potassium carbonate, sodium bicarbonate, ammonia, and the like). Acid release can be coincident with setting the oligomeric metal oxide precursor; that is, during irradiative and/or thermal treatment; alternatively, acid release can occur in a different irradiative and/or thermal treatment step.

Figure 3:
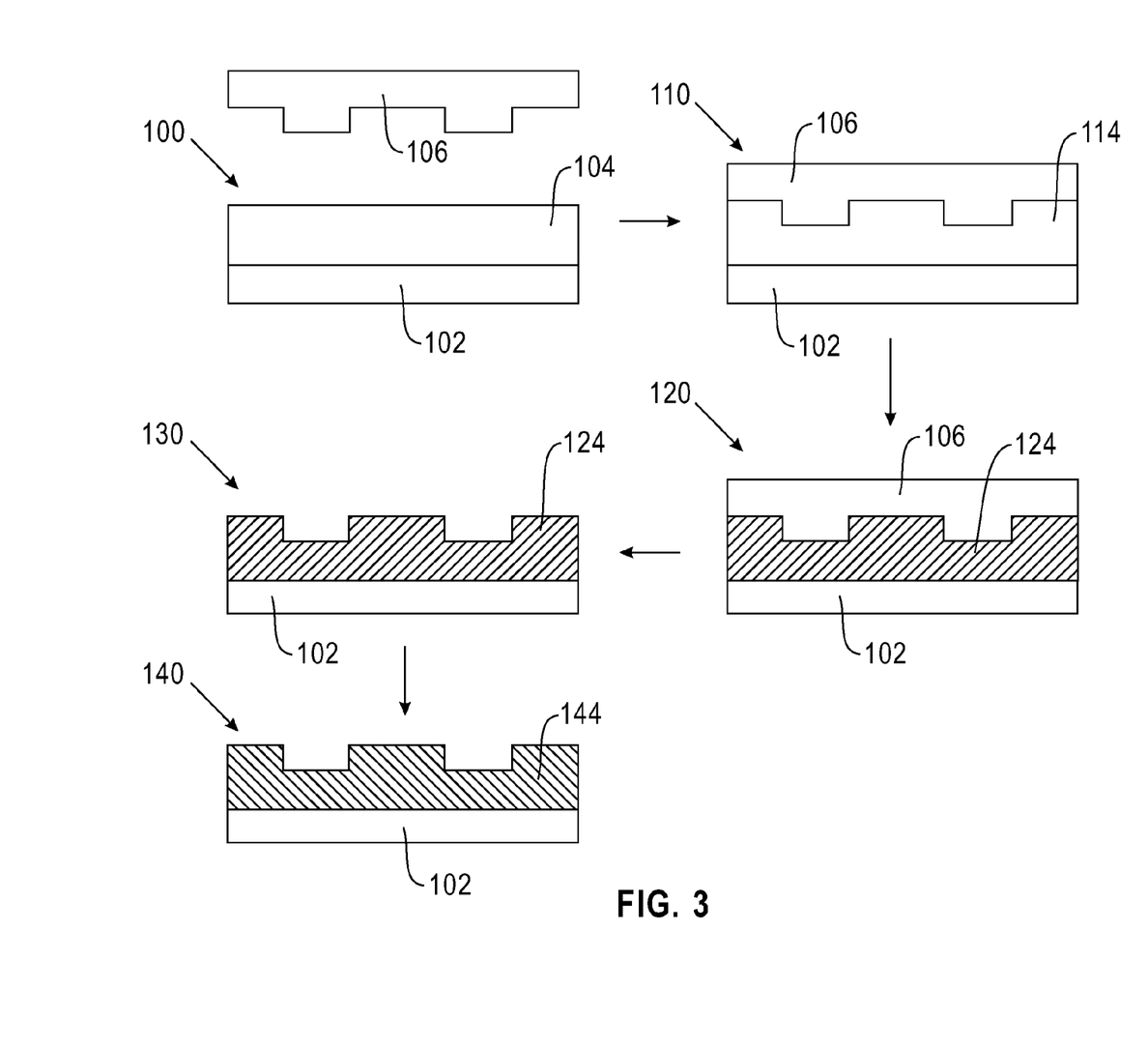
FIG. 3 is a schematic of the typical process flow of forming a metal oxide nanostructure by imprinting.

The template can also be used for imprinting the chelated oligomeric metal oxide precursor on a substrate, as shown schematically in FIG. 3. The imprint method comprises disposing the chelated oligomeric metal oxide precursor on a substrate 102 to form a first structure 100 comprising a deformable chelated oligomeric metal oxide precursor layer 104; contacting a solvent-soluble template 106 to the deformable chelated oligomeric metal oxide precursor layer 104 to form a second structure 110 comprising a shaped chelated oligomeric metal oxide precursor layer 114; setting the shaped chelated oligomeric metal oxide precursor layer 114 of second structure 110 to form a third structure 120 comprising a set metal oxide precursor layer 124; dissolving the solvent-soluble template 106 in a solvent to form a fourth structure 130 comprising the set metal oxide precursor layer 124; and thermally treating the fourth structure 130 to form a fifth structure 140 comprising a metal oxide nanostructure 144 disposed on substrate 102. In one embodiment, the solvent-soluble template is dissolved with an acidic, basic or neutral aqueous solution.

Also disclosed are metal oxide nanostructures derived from a chelated oligomeric metal oxide precursor by any of the above described methods. In one embodiment, the metal oxide nanostructure comprises titania. The titania can have a rutile, brookite, or anatase crystalline structure. In particular, the titania crystalline structure is anatase. The metal oxide nanostructure can also be porous or nonporous after thermal treatment at temperatures above about 400° C.

The following non-limiting example illustrates the practice of the disclosed method.

Figure 4:
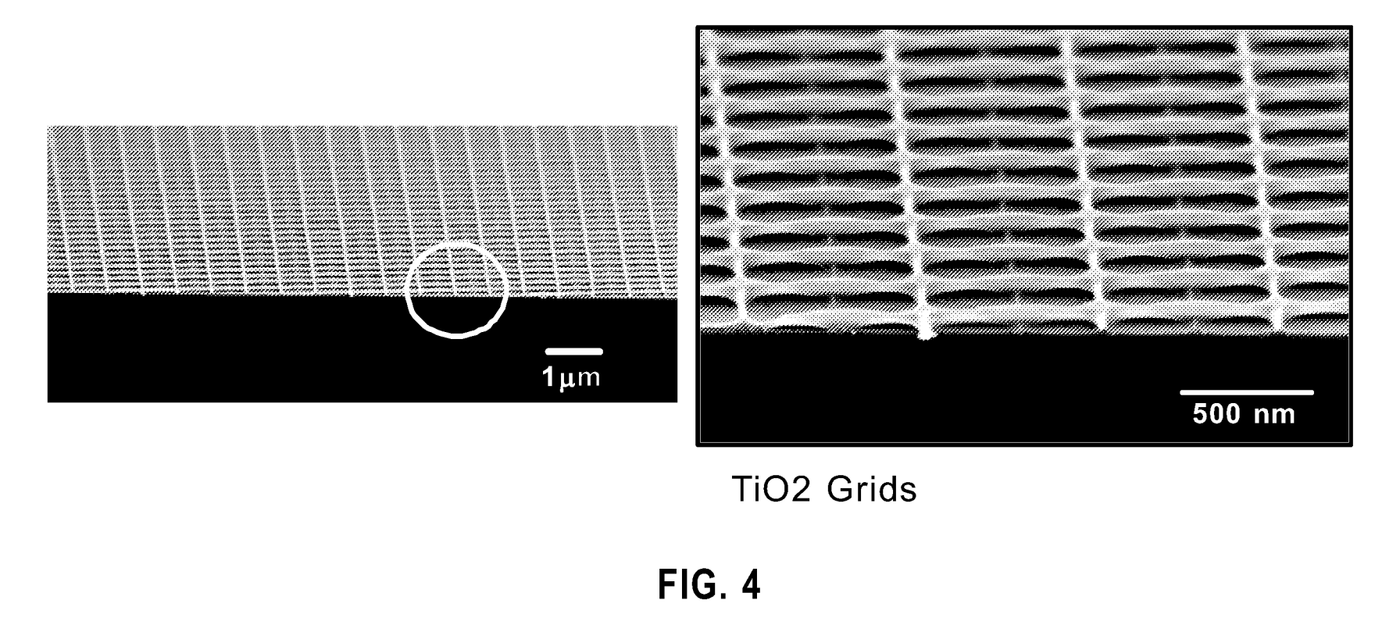
FIG. 4 is a set of scanning electron micrographs (SEM) images of a nanostructured titania at different magnification. Samples were baked at 450° C. for 2 hours.
Figure 5:
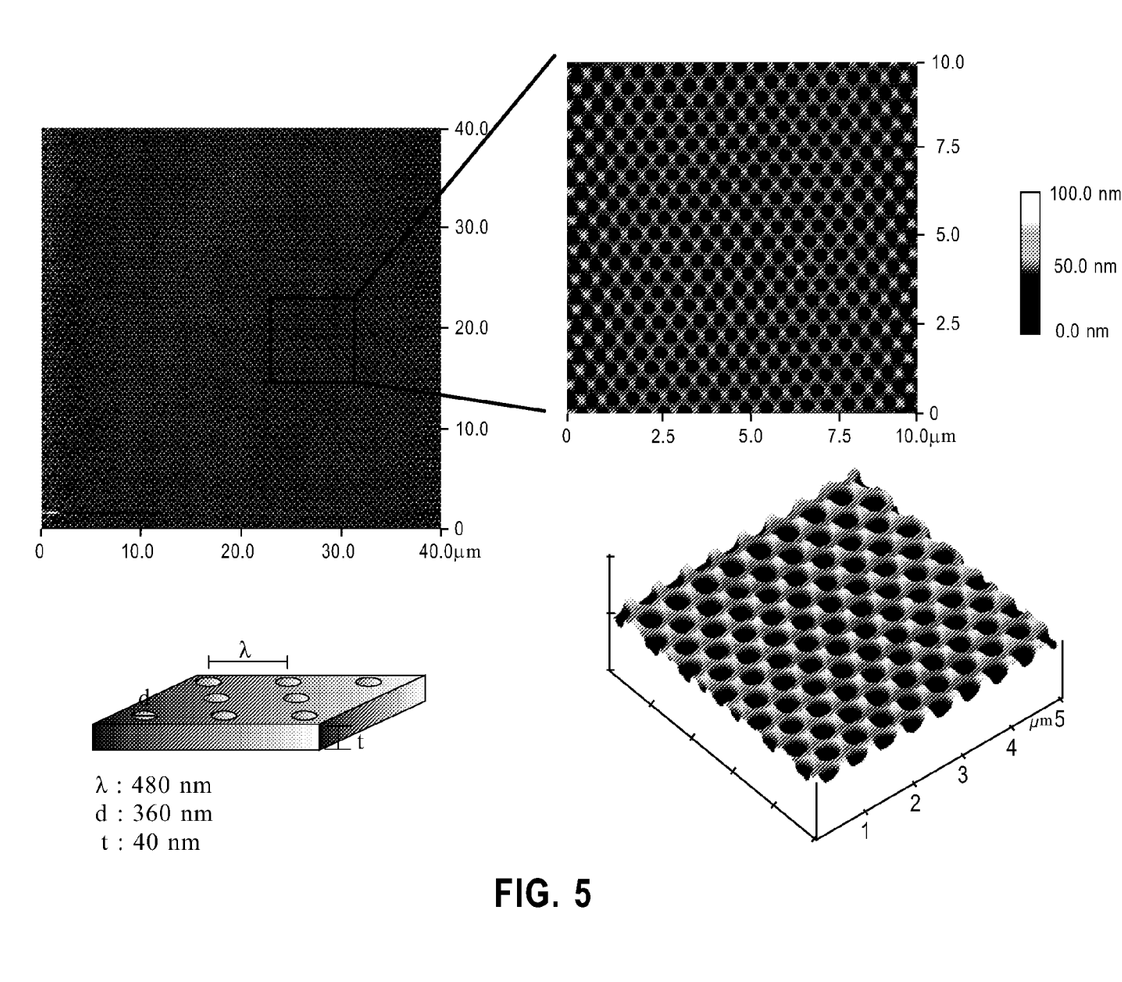
FIG. 5 is a set of atomic force microscopy (AFM) (height contrast) images of a nanostructured titania. Samples were baked at 450° C. for 2 hours.
Figure 6:
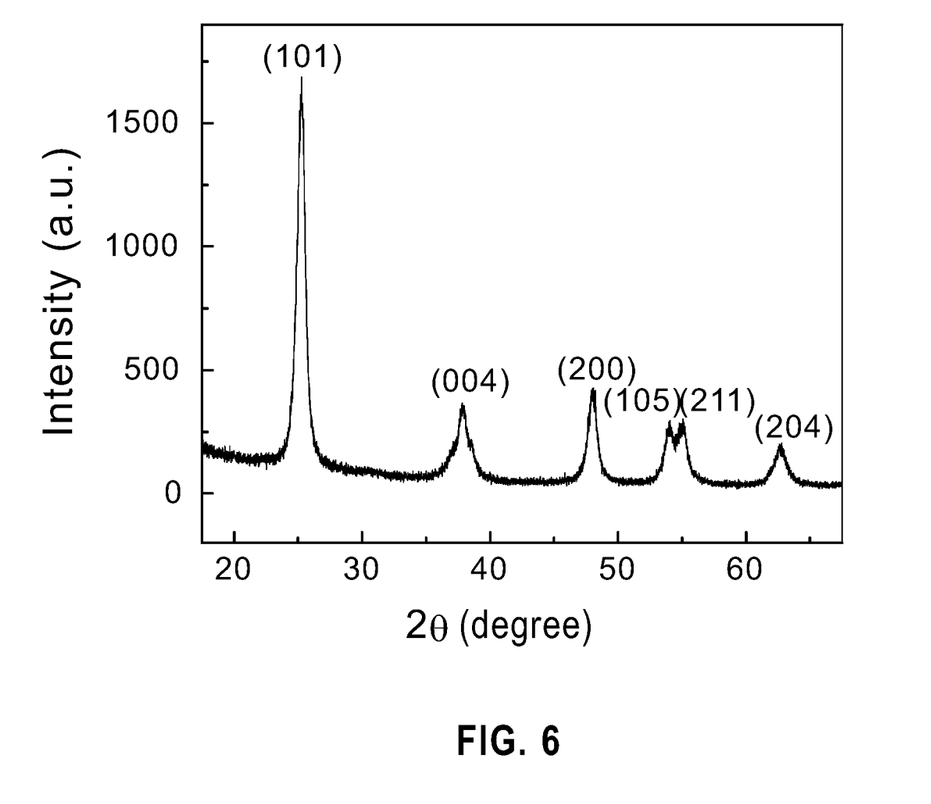
FIG. 6 is a graph of the grazing angle X-ray diffraction of the titania nanostructure film.
Figure 7:
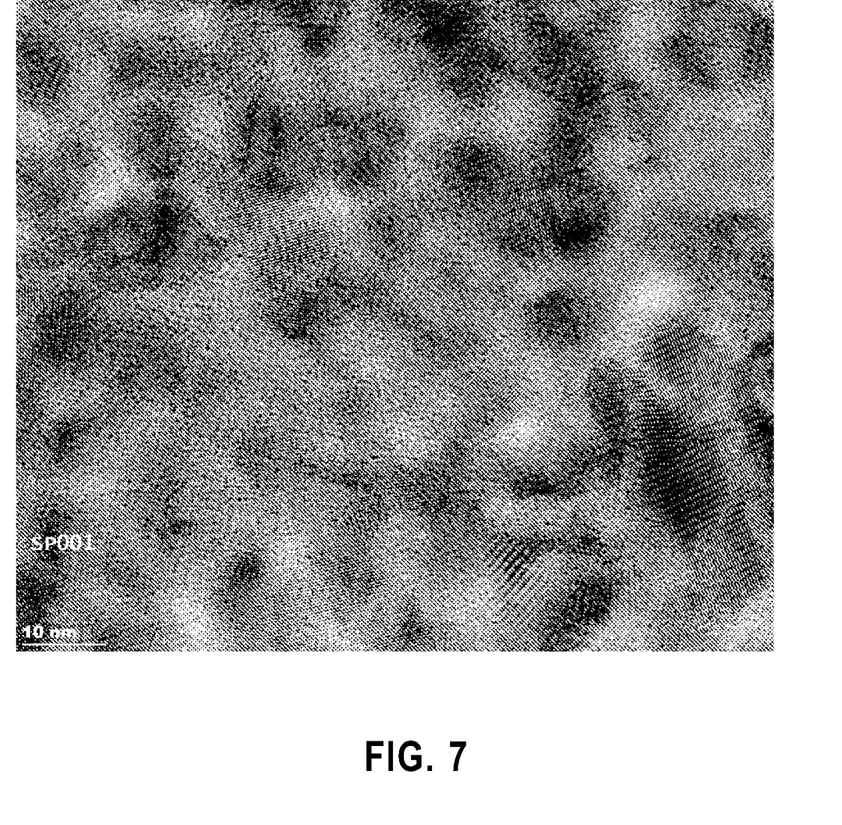
FIG. 7 is a high-resolution transmission electron microscopy (HRTEM) image of the titania nanostructure film.

EXAMPLE 6.25 g of n-butyl polytitanate (TYZOR® BTP, sold by E.I. Du Pont De Nemours And Company Corporation, Wilmington, Del.) was mixed and reacted with 4.46 g of benzoylacetone (BzAc, Aldrich) to synthesize the chelated oligomeric titanate (OT). The mixture was stirred for 2 hours at room temperature. 20 wt % propylene glycol propyl ether (PGPE) solutions of the chelated OT were spun-cast onto a water-soluble PVA template obtained from Transfer Device Incorporated. A silicon wafer substrate was laminated on top of OT coated template by passing the substrate and OT coated template through a pair of rubber rolls. The chelated oligomeric OT was UV-irradiated for 1 min with a dose of 100 mJ/cm2 at 365 nm (OAI high pressure short arc lamp with 365 nm filter from Oriel Co.) to set the oligomeric OT. The PVA template was then dissolved by dipping the sample into water. The samples were baked at 450° C. for 2 hours to crystallize the structures into anatase titania and simultaneously remove any organic components in the OT. FIG. 4 shows SEM micrographs at two magnifications of the crystalline titania nanostructure after the calcining heat treatment. FIG. 5 shows AFM images of the titania nanostructures after heat treatment. A grazing incident angle X-ray diffraction pattern of the titania film after baking at 450° C. for 2 hours is shown in FIG. 6, which indicates the anatase phase of titania. A high resolution transmission electron micrograph (HRTEM) image in FIG. 7 shows the nanocrystalline structure of the titania film.

The singular forms "a," "an," and "the" include plural referents unless the context clearly dictates otherwise. The endpoints of all ranges directed to the same characteristic or component are independently combinable and inclusive of the recited endpoint. All amounts, parts, ratios and percentages used herein are by weight unless otherwise specified.

This written description uses an example to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A substrate comprising a free-standing three dimensional chelated oligomeric metal oxide precursor bonded to the substrate, wherein the free-standing three dimensional chelated oligomeric metal oxide precursor is a non-sol-gel type, and the substrate is solvent soluble, wherein the free-standing three dimensional chelated oligomeric metal oxide precursor is of the formula:

(5)

wherein R, R', and R" are independently a C1-C20 alkyl group, m is an integer from zero to n−1, and n is an integer from 2 to 10,
  wherein the free-standing three dimensional chelated oligomeric metal oxide precursor thermally deformable to a metal oxide nanostructure comprising anatase titania.

2. The substrate of claim 1, wherein the chelated oligomeric metal oxide precursor comprises a chelated oligomeric titanate derived from the reaction of n-butyl polytitanate and a chelating agent.

* * * * *